(No Model.)
J. DUSHANE.
EDUCATIONAL APPARATUS.
No. 385,046. Patented June 26, 1888.
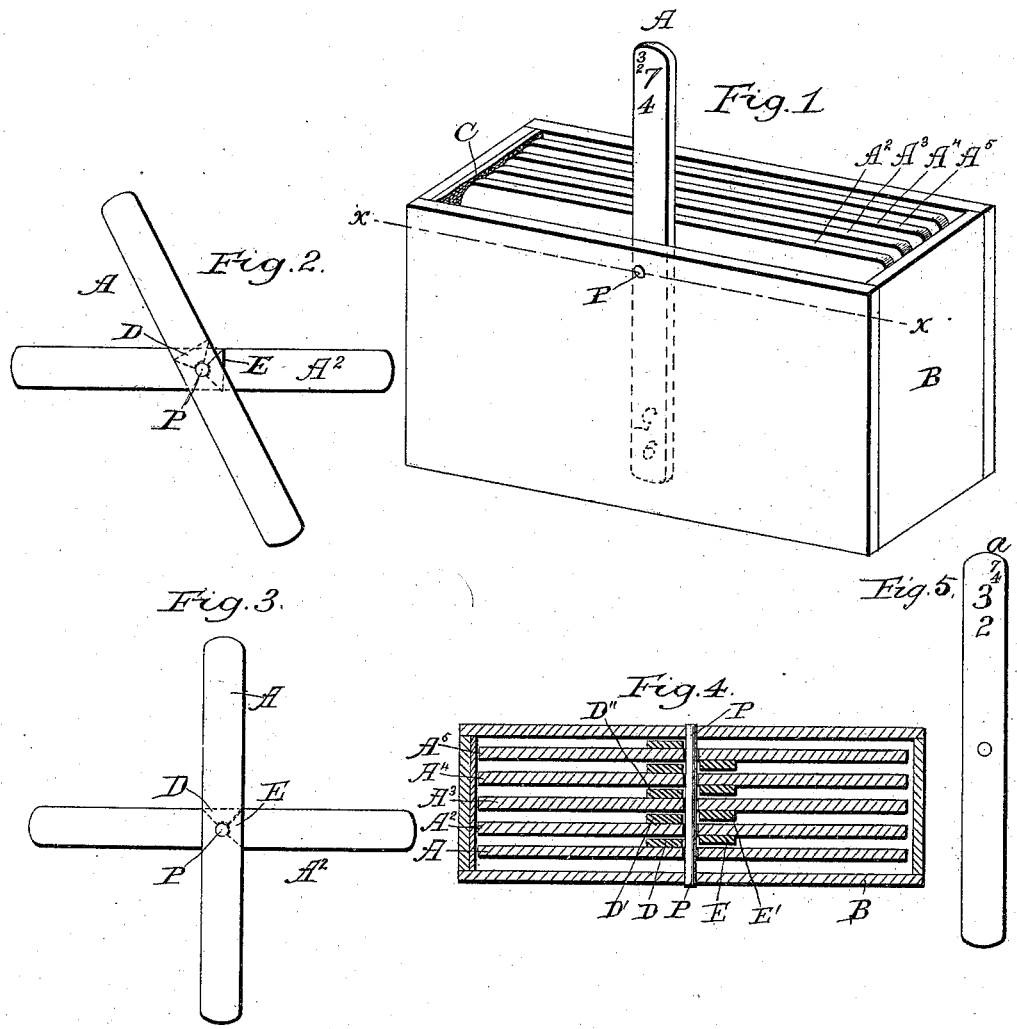
Witnesses:
Willis A. Bugbee
Chas. W. Wiley
Inventor.
Jas. Dushane

UNITED STATES PATENT OFFICE.

JAMES DUSHANE, OF SOUTH BEND, INDIANA.

EDUCATIONAL APPARATUS.

SPECIFICATION forming part of Letters Patent No. 385,046, dated June 26, 1888.

Application filed July 8, 1886. Serial No. 207,458. (No model.)

*To all whom it may concern:*

Be it known that I, JAMES DUSHANE, of South Bend, in the county of St. Joseph and State of Indiana, have invented certain new and useful Improvements in Educational Apparatus; and I do hereby declare that the following is a full, clear, and exact description thereof, reference being had to the accompanying drawings, and to the letters of reference marked thereon, which form part of this specification.

This invention is an improved apparatus for teaching the combinations of numbers or color or words or form.

It consists of a series of tablets, upon which are printed the combinations of number, color, or form which it is desired to teach.

Figure 1 shows the tablets assembled in a box. Fig. 2 illustrates the action of the tablets upon each other. Fig. 3 is a further illustration of the same. Fig. 4 is a horizontal section of the tablets assembled in a box along the line $x\,x$, showing the relations of the various parts. Fig. 5 is a plan view of one of the tablets, showing one set of lesson-figures and indicating-figures, the use of which will more fully appear hereinafter.

The principal feature of this invention consists in providing a tablet or series of tablets with various characters large enough to be plainly visible to pupils, and on the reverse side smaller characters indicating what is exposed on the other side, so that when the teacher holds the tablet up before her class she may know by means of these small characters what is exposed to the view of the pupils.

For example, suppose $a$, Fig. 5, to be held up facing the teacher. The small figures $\tfrac{7}{4}$ would tell the teacher that those figures formed the combination on the other side visible to the pupils. The pupils would see the side that is shown at A, Fig. 1. When the tablet is turned around, the pupils would see the side shown in Fig. 5 and the teacher that at A, Fig. 1, and so on throughout the series. These guide-numbers facilitate the teacher's work, as no time is lost in turning the tablet around to see whether the children had answered right or not. As she holds the tablet up she can put various questions to the class as to the device displayed.

It is evident that the tablets may be prepared to teach color or form or words or sounds or anything that admits of pictorial representation, and I have used figures simply as a convenient means of illustrating its use.

Instead of having the tablets independent and free of each other, it is sometimes preferred to assemble them, and one effective mode of doing this is shown in the remaining figures.

It will be understood that characters may be printed on both ends and on both sides of each tablet, and that the hole through the center of the tablets, as shown in Fig. 5, is not essential, save when they are to be assembled, as I shall now explain. For this purpose the tablets are perforated at their centers, and on the back side of the first tablet is secured a triangular block, as shown at D, Figs. 2 and 3. On the other side of the hole, or at a distance of one hundred and eighty degrees from this block when both tablets are horizontal, another triangular block, E, is secured to the front side of the second tablet, and on its back on the opposite side of the hole is secured another similar block, and so on with each succeeding tablet throughout the series. They are then mounted on a pin which forms their common axis and which secures them in the box, as shown in Figs. 1 and 4. The bearing-edges of these blocks D and E are ninety degrees from each other when the tablets are horizontal, so that when a tablet is raised to a vertical position these edges are brought into contact. Fig. 2 shows a tablet partly raised; Fig. 3, entirely so. It is now evident that any further rotation of A will turn $A^2$, and when A becomes horizontal $A^2$ will be vertical; and so on throughout the series each tablet will, when depressed, raise the succeeding one to view.

To use it, the teacher places the box before her and raises the first tablet. After suitably questioning the pupil on the device thus brought to his view, she turns this tablet down and another instantly appears, and so on. After using all of one side of the tablets, by turning the box half around the devices printed on the other side may be used.

It is evident that all the tablets might be raised at once, and then they could be turned aside one by one, thus disclosing the several devices thereon. In this case the blocks D E would be unnecessary. A number of ways might be mentioned whereby the tablets might actuate each other. Pins or strings or interlocking washers might be used instead of the blocks, or they might be used without the box, so that I do not wish to be confined to the exact construction shown.

At C, Fig. 1, is shown a piece of flexible material—such as Brussels carpet—against which the ends of the tablets brush as they turn. This supplies sufficient friction, so that but one piece turns at a time—that is, the friction between adjacent tablets is not great enough to overcome the friction at the ends of the strips. Thus each piece does not move until its adjacent tablet forces it to turn by the blocks on their surfaces, as described.

Having thus described my invention, I claim and desire to secure by Letters Patent of the United States—

1. A tablet for educational purposes having upon its faces various educational devices, such as figures or letters or color, large enough to be seen by the pupils, and smaller devices, words, letters, or figures on each side that will show what is exposed on the other side, substantially as described.

2. A tablet for educational purposes having on each side various combinations of large figures or devices and smaller guide figures or devices identical with the figures or devices exposed on the other side, as and for the purpose described.

3. A tablet for educational purposes having a large device on one side and an indicating or guide device on the other that will show what is on the other side.

4. A tablet for educational purposes having a large device on one side and an indicating or guide device or word on the other that will show what the large device is.

5. A tablet for educational purposes having one or more sets of devices or figures on each side and indicating devices, words, or figures to show what is on the opposite side.

6. A series of tablets revolving on a common axis and provided with means, such as interlocking blocks or lugs, whereby when one tablet is turned out of sight the face of the next succeeding one is brought to view.

7. A series of tablets mounted upon a common axis and provided with interlocking blocks or lugs, substantially as and for the purpose described.

8. The combination of a box, a series of vertically-revolving tablets, and a friction-surface for engaging the ends of said tablets as they pass, substantially as and for the purpose set forth.

In testimony that I claim the foregoing as my own I affix my signature in presence of two witnesses.

JAMES DUSHANE.

Witnesses:
 CHAS. W. WILEY,
 WILLIS A. BUGBEE.